United States Patent
Yamanaka

(10) Patent No.: US 10,641,660 B2
(45) Date of Patent: May 5, 2020

(54) TEMPERATURE SENSOR, DEVICE USING SAME, AND TEMPERATURE MEASUREMENT METHOD

(71) Applicant: Panasonic Corporation, Osaka (JP)

(72) Inventor: Hiroshi Yamanaka, Fukui (JP)

(73) Assignee: PANASONIC CORPORATION, Osaka (JP)

( * ) Notice: Subject to any disclaimer, the term of this patent is extended or adjusted under 35 U.S.C. 154(b) by 434 days.

(21) Appl. No.: 15/309,517

(22) PCT Filed: May 20, 2015

(86) PCT No.: PCT/JP2015/002522
§ 371 (c)(1),
(2) Date: Nov. 8, 2016

(87) PCT Pub. No.: WO2015/182066
PCT Pub. Date: Dec. 3, 2015

(65) Prior Publication Data
US 2017/0160141 A1    Jun. 8, 2017

(30) Foreign Application Priority Data

May 30, 2014  (JP) ................................ 2014-112097

(51) Int. Cl.
*G01J 5/56* (2006.01)
*G01J 5/10* (2006.01)
(Continued)

(52) U.S. Cl.
CPC .............. *G01J 5/56* (2013.01); *G01J 5/0003* (2013.01); *G01J 5/045* (2013.01); *G01J 5/06* (2013.01);
(Continued)

(58) Field of Classification Search
CPC ........ G01J 5/56; G01J 5/52; G01J 5/48; G01J 5/10; G01J 2005/0055; G01J 2005/528; G01J 2005/106; H04N 5/33; G01K 1/20
See application file for complete search history.

(56) References Cited

U.S. PATENT DOCUMENTS 5,877,688 A * 3/1999 Morinaka ............. G01S 7/4813
340/584
6,188,069 B1   2/2001 Endoh
(Continued)

FOREIGN PATENT DOCUMENTS

CN    103282753 A    9/2013
EP    2060857 A1    5/2009
(Continued)

OTHER PUBLICATIONS

International Search Report of PCT application No. PCT/JP2015/002522 dated Aug. 18, 2015.
(Continued)

*Primary Examiner* — Natalie Huls
*Assistant Examiner* — Janice M Soto
(74) *Attorney, Agent, or Firm* — McDermott Will & Emery LLP

(57) ABSTRACT

A temperature sensor includes a first infrared measuring means, a second infrared measuring means, and a calculating unit. The first infrared measuring means measures infrared rays emitted from an object and outputs a first voltage. The second infrared measuring means measures infrared rays emitted from around the object and outputs a second voltage. The calculating unit calculates the output temperature of the object from the first voltage, calculates the ambient temperature of the object from the second voltage, and corrects the output temperature based on the ambient temperature to calculate the temperature of the object.

12 Claims, 10 Drawing Sheets

(51) Int. Cl.
G01J 5/48 (2006.01)
G01J 5/00 (2006.01)
G01J 5/12 (2006.01)
G01J 5/08 (2006.01)
G01J 5/06 (2006.01)
G01J 5/20 (2006.01)
G01J 5/04 (2006.01)
G01J 5/52 (2006.01)
G01K 1/20 (2006.01)
H04N 5/33 (2006.01)
H04N 5/225 (2006.01)

(52) U.S. Cl.
CPC .......... *G01J 5/0806* (2013.01); *G01J 5/0846* (2013.01); *G01J 5/10* (2013.01); *G01J 5/12* (2013.01); *G01J 5/20* (2013.01); *G01J 5/48* (2013.01); *G01J 5/52* (2013.01); *G01K 1/20* (2013.01); *H04N 5/33* (2013.01); *G01J 2005/0048* (2013.01); *G01J 2005/0055* (2013.01); *G01J 2005/066* (2013.01); *G01J 2005/067* (2013.01); *G01J 2005/106* (2013.01); *G01J 2005/528* (2013.01); *H04N 5/2253* (2013.01); *H04N 5/2254* (2013.01)

(56) References Cited

U.S. PATENT DOCUMENTS

| | | | | |
|---|---|---|---|---|
| 2008/0251721 | A1* | 10/2008 | Ueno | G01J 5/08 250/332 |
| 2012/0170612 | A1* | 7/2012 | Pompei | G01J 5/0066 374/126 |
| 2013/0230074 | A1* | 9/2013 | Shin | G01J 5/0025 374/129 |
| 2013/0235901 | A1 | 9/2013 | Shin | |
| 2013/0296685 | A1 | 11/2013 | Tsuboi et al. | |

FOREIGN PATENT DOCUMENTS

| | | | |
|---|---|---|---|
| JP | 55-076920 | | 6/1980 |
| JP | 62-163937 | | 7/1987 |
| JP | 62163937 | * | 7/1987 |
| JP | 3-293585 | | 12/1991 |
| JP | 4-032378 | A | 2/1992 |
| JP | 6-341906 | A | 12/1994 |
| JP | 11-166863 | A | 6/1999 |
| JP | 2001-337059 | A | 12/2001 |
| JP | 2004-061283 | A | 2/2004 |
| JP | 2007-248201 | | 9/2007 |
| JP | 2011-089983 | | 5/2011 |
| JP | 2012-013517 | | 1/2012 |
| JP | 2012-078160 | | 4/2012 |
| JP | 2013-202260 | | 10/2013 |
| JP | 2013-543133 | A | 11/2013 |
| JP | 2013-251254 | | 12/2013 |
| JP | 2013251254 | * | 12/2013 |
| WO | 2008/029679 | A1 | 3/2008 |

OTHER PUBLICATIONS

English Translation of Chinese Search Report dated Aug. 30, 2018 for the related Chinese Patent Application No. 201580027008.X.

* cited by examiner

US 10,641,660 B2

TEMPERATURE SENSOR, DEVICE USING SAME, AND TEMPERATURE MEASUREMENT METHOD

This application is a U.S. national stage application of the PCT international application No. PCT/JP2015/002522.

TECHNICAL FIELD

The present disclosure relates to a temperature sensor that measures the temperature of an object, to a device using the sensor, and to a temperature measurement method.

BACKGROUND ART

An infrared sensor is used for a cooking device for example as a temperature sensor that measures the temperature of an object such as foodstuffs.

The method of correcting infrared sensor signals in PTL 1 has a first correction process and a second correction process. The first correction process includes a process of adding or subtracting offset correction amount A based on the environmental temperature. The second correction process is performed after the first one and includes a process of multiplying correction coefficient B based on the environmental temperature.

When infrared rays emitted from a measurement target reaches the infrared sensor unit, infrared sensor signal $S_{IR}$ corresponding to the amount of infrared energy is output as a voltage value.

In the first correction process, adding or subtracting offset correction amount A determined by the environmental temperature to or from infrared sensor signal $S_{IR}$ provides a first corrected signal. Here, offset correction amount A is a correction amount determined by the type of the infrared sensor unit of the infrared sensor device and by a function on the environmental temperature. Offset correction amount A is expressed by a function including terms of the third and/or second order.

Offset correction amount A is determined as follows. For example, the temperature of a measurement target at a constant temperature is measured under conditions with different environmental temperatures. Then, plotting environmental temperatures (the horizontal axis) and infrared sensor signals (the vertical axis) produces offset correction amount A as a function on the environmental temperature. In other words, offset correction amount A is determined at each environmental temperature.

Next, in the second correction process, multiplying the first corrected signal by correction coefficient B determined by the environmental temperature produces a second corrected signal that is substantially constant for environmental temperatures. Here, correction coefficient B is a coefficient that does not have a unit, and a signal that is the first corrected signal to or from which offset correction amount A is added or subtracted is multiplied by correction coefficient B.

Disclosure is made that two-step correction as described above is performed for correction based on the environmental temperature.

The temperature sensor in PTL 2 includes an infrared sensor, a thermistor, and a calculating unit. The infrared sensor is formed of a thermopile and converts thermal energy to electric energy. The thermistor measures the temperature of the infrared sensor. The calculating unit, formed of IC elements, computes the temperature of an object as a measurement target based on output voltages of the infrared sensor and the thermistor. This infrared sensor uses the thermistor to measure the temperature of the infrared sensor and corrects the output voltage of the infrared sensor based on the output voltage of the thermistor.

CITATION LIST

Patent Literature

PTL 1: Japanese Patent Unexamined Publication No. 2012-78160
PTL 2: Japanese Patent Unexamined Publication No. 2012-13517

SUMMARY OF THE INVENTION

A temperature sensor of the present disclosure includes a first infrared measurement means, a second infrared measurement means, and a calculating unit. The first infrared measurement means measures infrared rays emitted from an object and outputs a first voltage. The second infrared measurement means measures infrared rays emitted from around the object and outputs a second voltage. The calculating unit calculates the output temperature of the object based on the first voltage, calculates the ambient temperature of the object from the second voltage, and corrects the output temperature based on the ambient temperature, to calculate the temperature of the object.

The device of the disclosure, besides the above-described temperature sensor, includes an operating unit that operates in response to a corrected signal from the calculating unit.

The temperature measurement method of the disclosure includes:
measuring infrared rays emitted from an object and outputting a first voltage;
measuring infrared rays emitted from around the object and outputting a second voltage;
calculating the output temperature of the object based on the first voltage;
calculating the ambient temperature of the object based on the second voltage; and
correcting the output temperature based on the ambient temperature, to calculate the temperature of the object.

DESCRIPTION OF EMBODIMENT

An existing temperature sensor performs correction in a complicated way. Also, the higher-order function used results in a more complicated calculating process and a longer processing time, which requires a high-performance calculating circuit. Further, it is difficult to adequately reflect the influence by the ambient temperature of an object.

EXEMPLARY EMBODIMENT

Hereinafter, a description is made of a temperature sensor of an embodiment using the drawings.

Figure 1:
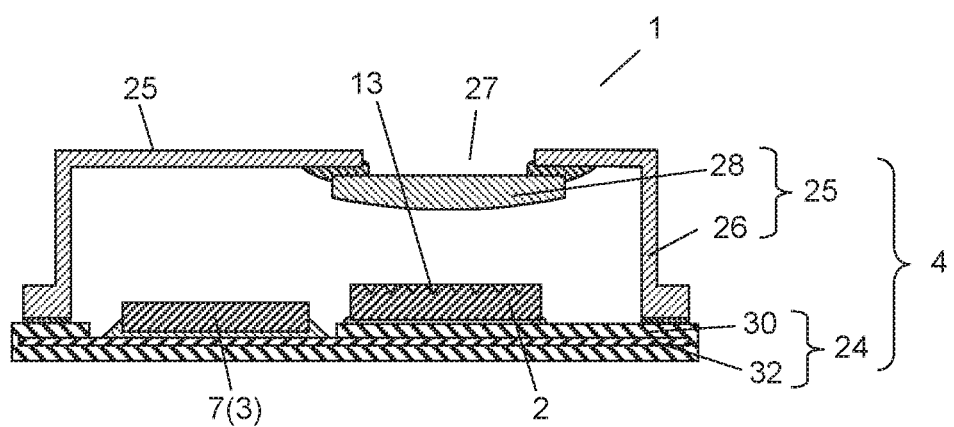
FIG. 1 is a sectional view of a temperature sensor according to an embodiment.
Figure 2:
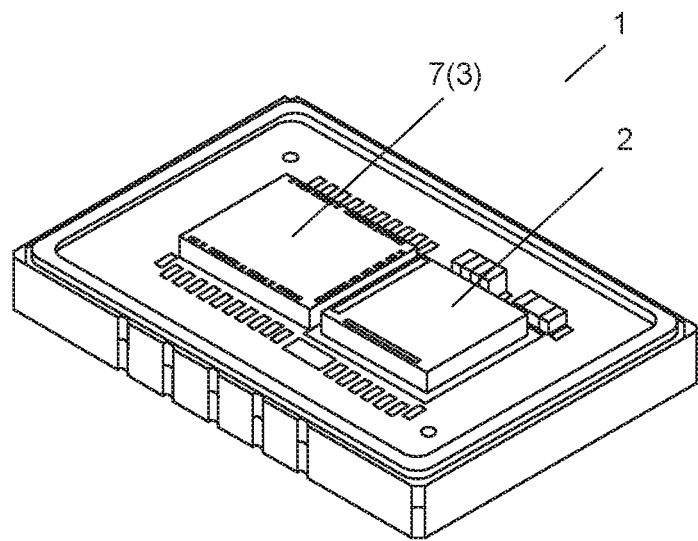
FIG. 2 is a perspective view of the temperature sensor according to the embodiment, with its package lid removed.
Figure 3:
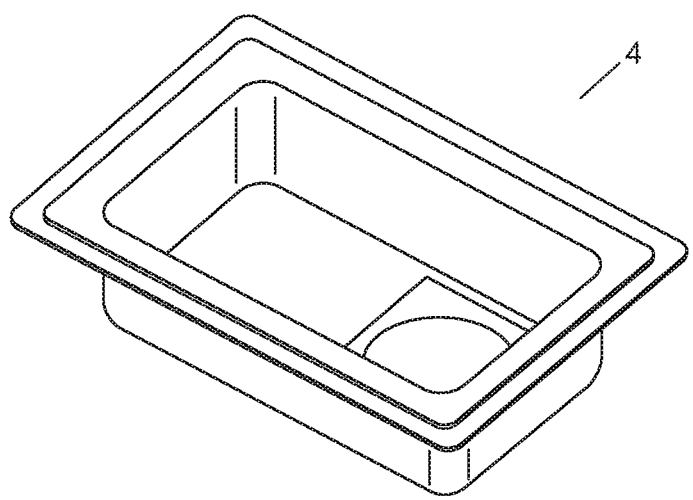
FIG. 3 is a perspective view of the package lid according to the embodiment, viewed from its opening.
Figure 4:
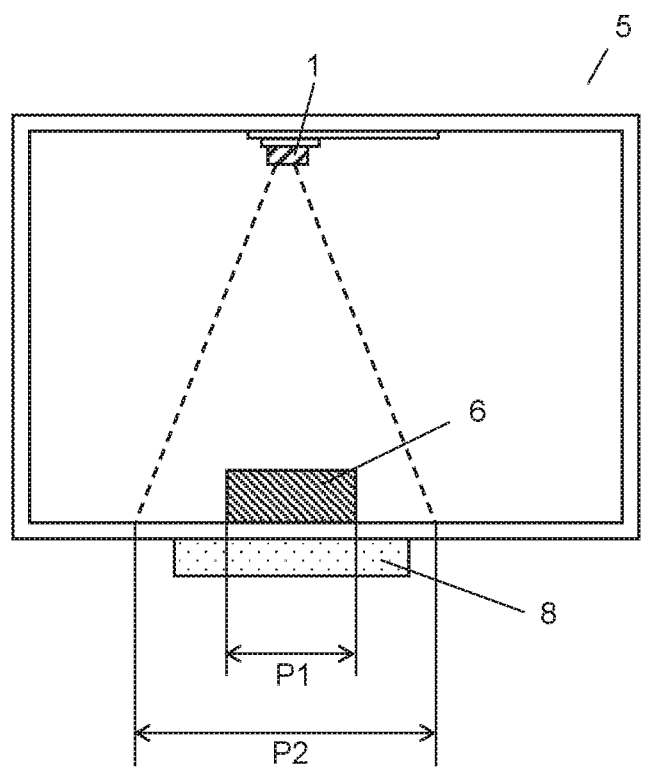
FIG. 4 is a sectional view of a device including the temperature sensor according to the embodiment.
Figure 5:
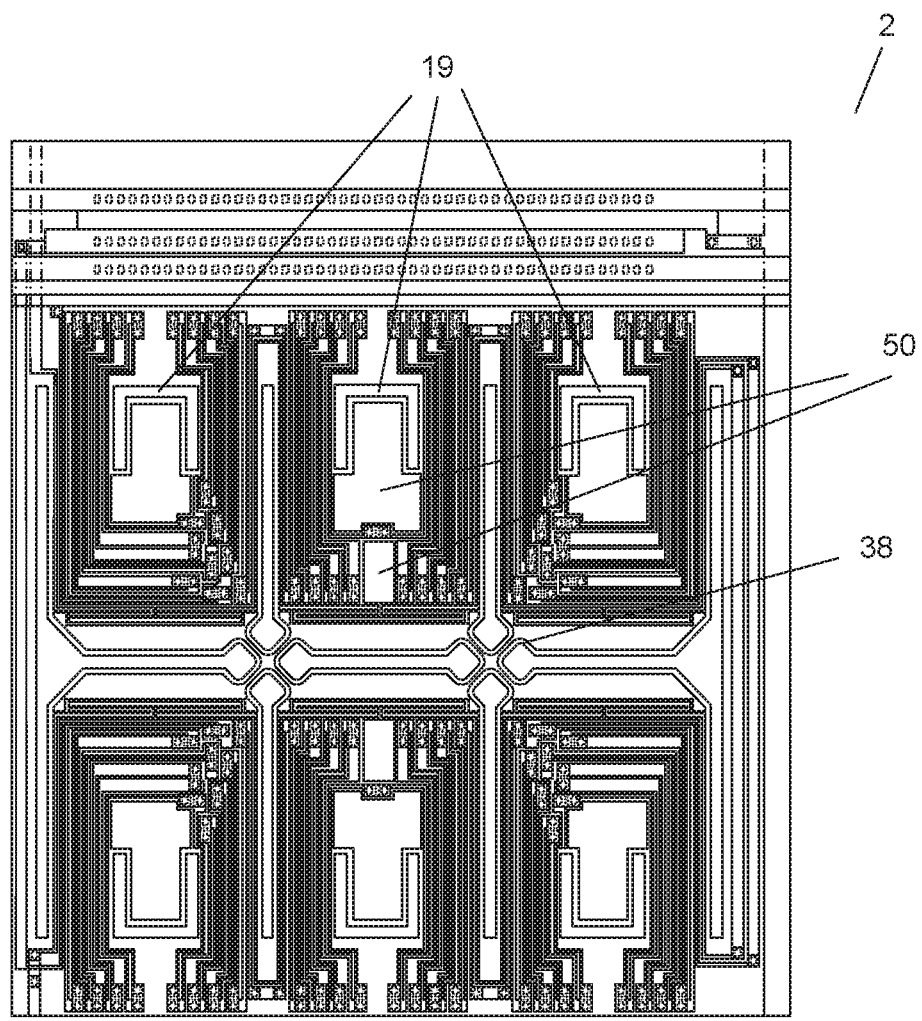
FIG. 5 is a main part top view of an infrared sensor according to the embodiment.
Figure 6:
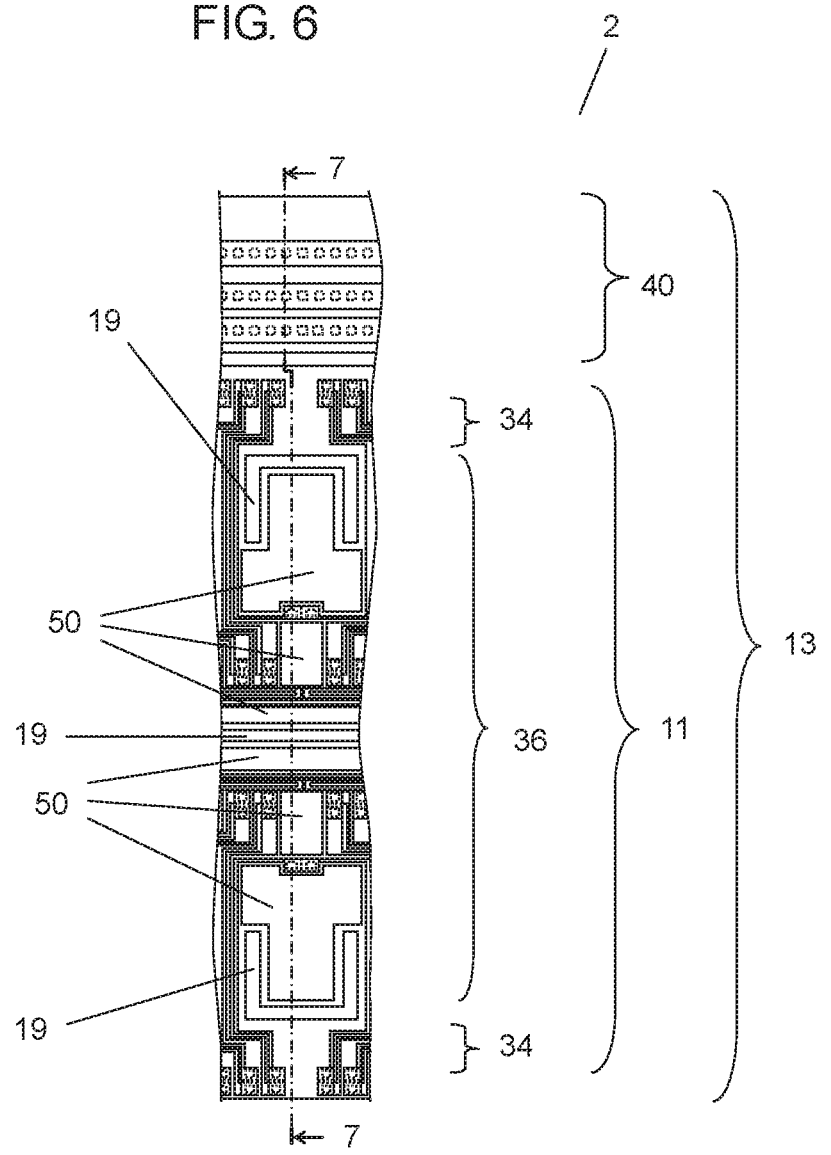
FIG. 6 is a main part top view of the infrared sensor according to the embodiment.
Figure 7:
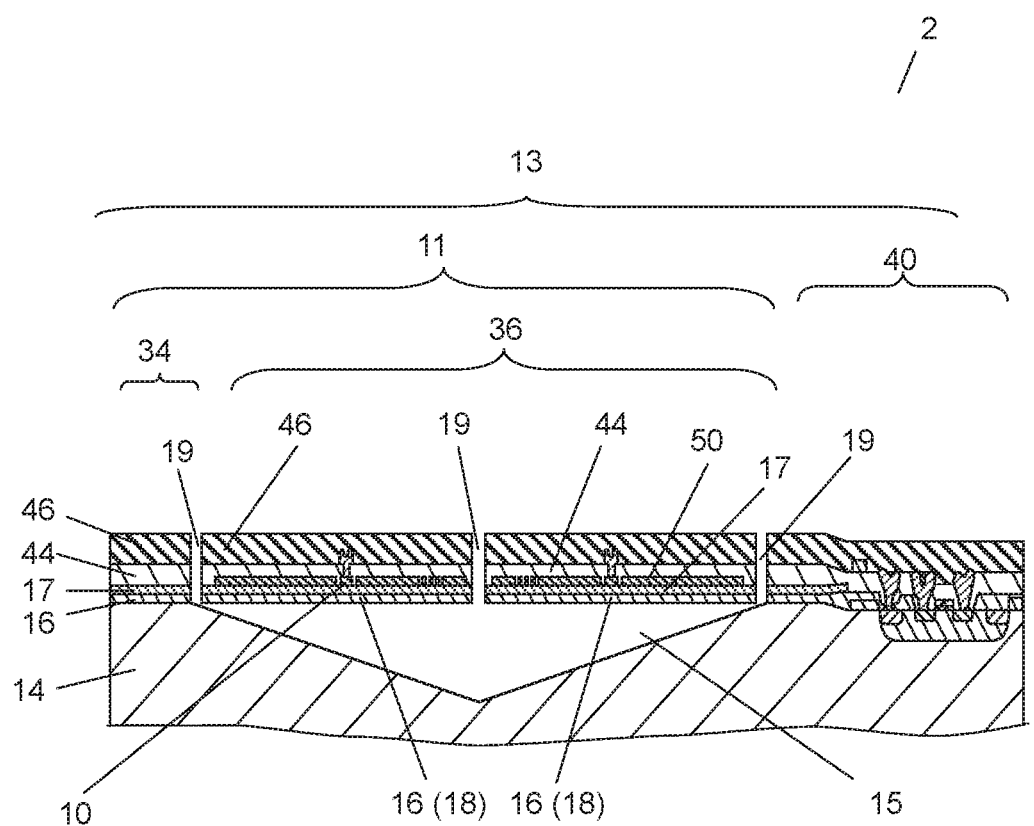
FIG. 7 is a sectional view of the infrared sensor, taken along line 7-7 of FIG. 6.
Figure 8:
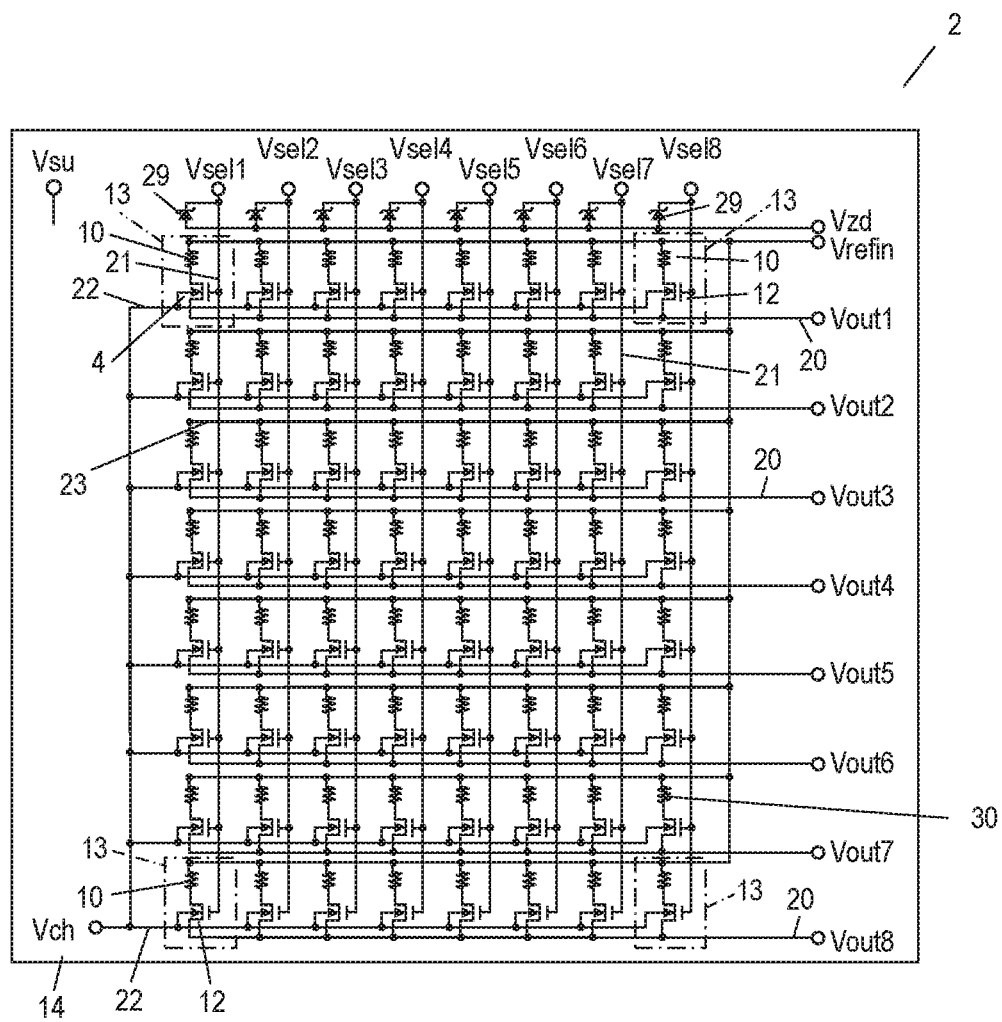
FIG. 8 is an equivalent circuit diagram of the infrared sensor according to the embodiment.
Figure 9:
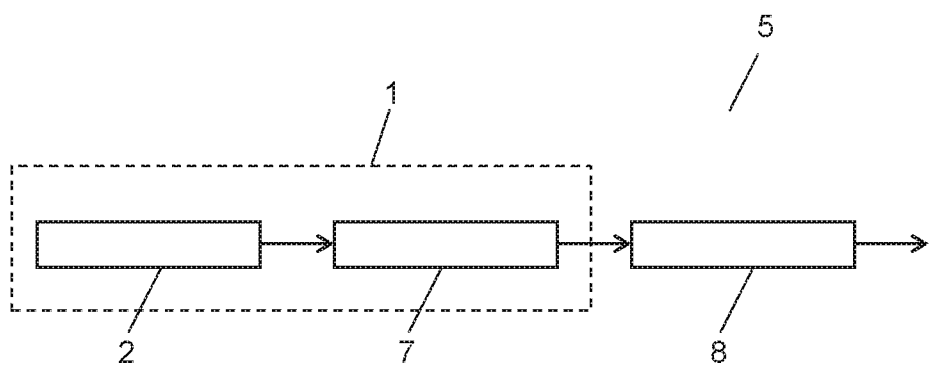
FIG. 9 is a block diagram of a device including the temperature sensor according to the embodiment.

FIG. 1 is a sectional view of temperature sensor 1 according to the embodiment. FIG. 2 is a perspective view of temperature sensor 1 according to the embodiment, with package lid 25 removed. FIG. 3 is a perspective view of package lid 25 according to the embodiment, viewed from its opening. FIG. 4 is a sectional view of device 5 including temperature sensor 1 according to the embodiment. FIG. 5 is a main part top view of infrared sensor 2 according to the embodiment. FIG. 6 is a main part top view of infrared sensor 2 according to the embodiment. FIG. 7 is a sectional view of sensor 2, taken along line 7-7 of FIG. 6. FIG. 8 is an equivalent circuit diagram of infrared sensor 2 according to the embodiment. FIG. 9 is a block diagram of device 5 including temperature sensor 1 according to the embodiment. Note that interlayer insulating film 44 and passivation film 46 are omitted in FIGS. 5 and 6 for the configuration to be easily understood.

Temperature sensor 1 of the disclosure includes a first infrared measurement means, a second infrared measurement means, and calculating unit 7. The first infrared measurement means measures infrared rays emitted from object 6 and outputs a first voltage (an output voltage). The second infrared measurement means measures infrared rays emitted from around object 6 and outputs a second voltage (an output voltage). Calculating unit 7 calculates output temperature $T_{out}$ of object 6 based on the first voltage, calculates ambient temperature $T_{amb}$ of object 6 based on the second voltage; and corrects output temperature $T_{out}$ based on ambient temperature $T_{amb}$, to calculate temperature $T_{obj}$ of object 6.

Note that, in this embodiment, infrared sensor 2 is used as the first and second infrared measurement means; separate infrared sensors may be used as these means.

Hereinafter, a detailed description is made of temperature sensor 1. Temperature sensor 1 includes infrared sensor 2 (an infrared measurement means) and calculating unit 7. Calculating unit 7 includes IC element 3. Infrared sensor 2 and calculating unit 7 are accommodated in package 4. Temperature sensor 1 is mounted on device 5 (refer to FIG. 4). Infrared sensor 2 measures the temperature of object 6 and outputs an output signal. Calculating unit 7 corrects the output signal from infrared sensor 2 and transmits the corrected signal to operating unit 8 equipped in device 5. Operating unit 8 operates device 5 according to the corrected signal from calculating unit 7. In this embodiment, detection region 70 (refer to FIG. 10) of temperature sensor 1 is square-shaped, as is the surface of object 6 as a measurement target facing temperature sensor 1. In FIG. 4, side P1 is one side of area S1 of object 6 as a measurement target to be detected; side P2 is one side of area S2 corresponding to detection region 70 of temperature sensor 1.

As shown in FIG. 1, package 4 includes package body 24 and package lid 25. Package body 24 includes substrate 30 made of an insulating material and electromagnetic shielding layer 32. Substrate 30 has infrared sensor 2 and calculating unit 7 mounted thereon side by side. Package lid 25 and package body 24 are airtight-joined together so as to enclose infrared sensor 2 and calculating unit 7.

Package lid 25 is composed of metal cap 26 and infrared transmissive component 28. Metal cap 26 is placed on the surface of package body 24. Metal cap 26 has opening 27 formed at the position corresponding to infrared sensor 2. Infrared transmissive component 28 blocks opening 27 and transmits infrared rays. Infrared transmissive component 28 is disposed above infrared sensor 2. Infrared transmissive component 28 is formed of a lens. Infrared transmissive component 28 makes infrared rays converge into infrared sensor 2. In this embodiment, a lens is used as infrared transmissive component 28; besides a lens, a flat-shaped material for example may be used.

Infrared sensor 2 has pixel unit 13 (noncontact infrared detection element), a wiring unit (unillustrated), and a terminal unit (unillustrated). Pixel unit 13 includes thermal infrared detecting unit 11 and pixel switching unit 40. Thermal infrared detecting unit 11 has thermosensitive unit 10 as a thermoelectric converting unit embedded thereinto. Thermosensitive unit 10, formed of a thermopile, converts thermal energy caused by infrared rays emitted from an object as a measurement target to electric energy. Pixel switching unit 40, formed of MOS transistor 12, is used for extracting an output voltage of thermosensitive unit 10.

Pixel units 13 are disposed on semiconductor substrate 14 one-dimensionally or two-dimensionally in a matrix with a rows and b columns.

As shown in FIG. 8, this embodiment is described with an example where pixel units 13 are in a matrix with 8 rows and 8 columns (a=8, b=8); however, pixel units 13 may be in, beside a matrix with 8 rows and 8 columns, any matrix with a rows and b columns as long as (a≥1, b≥1) is satisfied. That is, the number of pixel units 13 may be one.

Infrared sensor 2 does not need to be fixed to substrate 30, but may be movable. Particularly for a small number of pixel units 13 (e.g., the number of pixel units 13 is one (a=1, b=1)), it is preferred that infrared sensor 2 is not fixed but is moved reciprocally for example. This allows infrared sensor 2 to detect a wider area than a case where infrared sensor 2 is fixed. In this way, moving infrared sensor 2 provides an advantage of the embodiment even for a small number of pixel units 13.

Thermal infrared detecting unit 11 includes supporting unit 34 and detecting unit 36. Supporting unit 34 is composed of first thin film structure unit 16, infrared absorptive unit 17, interlayer insulating film 44, and passivation film 46, all laminated together. First thin film structure unit 16 is formed of a silicon oxide film. Infrared absorptive unit 17 is formed of a silicon nitride film. Supporting unit 34 is formed on semiconductor substrate 14 and at the same time around hollow 15.

Detecting unit 36 is composed of first thin film structure unit 16, infrared absorptive unit 17, thermosensitive unit 10 (or infrared absorptive layer 50), interlayer insulating film 44, and passivation film 46, all laminated together. Detecting unit 36 is formed above semiconductor substrate 14. Hollow 15 is formed between detecting unit 36 and semiconductor substrate 14. In other words, hollow 15 is formed directly below detecting unit 36. Infrared absorptive unit 17 absorbs infrared rays. Infrared absorptive layer 50 formed suppresses warpage of first thin film structure unit 16. First thin film structure unit 16 is separated into multiple second thin film structure units 18 by multiple linear slits 19. Second thin film structure units 18 are disposed above hollow 15. Adjacent second thin film structure units 18 are connected together with connection piece 38 (refer to FIG. 5).

MOS transistor 12 is formed of a second conductive source region (unillustrated) and a second conductive drain region (unillustrated) away from each other within a first conductive well region (unillustrated) formed in the surface of semiconductor substrate 14. In this embodiment, the well region composes a channel forming region (unillustrated). The equivalent circuit diagram of FIG. 8 shows thermosensitive unit 10 with the symbol of a resistance.

Infrared sensor 2 includes 8 pieces (b pieces) of first wirings 20 to which each one end of thermosensitive units 10 of 8 pieces (b pieces) of pixel units 13 in each column is connected through between the source region and the drain region of MOS transistor 12.

Infrared sensor 2 includes multiple Zener diodes 29 the cathodes of which are connected to respective second wirings 21 in order to prevent overvoltage from being applied to between the gate electrodes and the source electrodes of MOS transistors 12.

Zener diode 29 has an anode electrode (unillustrated) formed in the first diffusion region and two cathode electrodes (unillustrated) formed in the second diffusion region. The anode electrode of Zener diode 29 is electrically connected to fifth pad Vzd. One cathode electrode of Zener diode 29 is electrically connected to the gate electrode of MOS transistor 12 connected to second wiring 21 through one second wiring 21. The other cathode electrode of Zener diode 29 is electrically connected to one of second pads $V_{sel1}$ through $V_{sel8}$ connected to second wiring 21.

Infrared sensor 2 includes sixth pad $V_{su}$ for substrate biasing to which semiconductor substrate 14 is connected.

Infrared sensor 2 includes 8 pieces (a pieces) of second wirings 21, 8 pieces (b pieces) of third wirings 22, and 8 pieces (b pieces) of fourth wirings 23. Eight pieces of second wirings 21 are formed in each row. The well regions of MOS transistors 12 in each row are connected to 8 pieces of third wirings 22. The other ends of 8 pieces of thermosensitive units 10 in each column are connected to 8 pieces of fourth wirings 23.

Infrared sensor 2 includes 8 pieces (b pieces) of first pads $V_{out1}$ through $V_{out8}$, 8 pieces (a pieces) of second pads $V_{sel1}$ through $V_{sel8}$, third pad $V_{ch}$, and fourth pad $V_{refin}$. Eight pieces of first pads $V_{out1}$ through $V_{out8}$ are for outputting, to which respective first wirings 20 are connected. Eight pieces of second pads $V_{sel1}$ through $V_{sel8}$ are for selecting pixel unit 13, to which respective second wirings 21 are connected. Third wiring 22 is connected to third pad $V_{ch}$. Fourth pad $V_{refin}$ is for reference biasing, to which fourth wiring 23 is electrically connected. The above-described configuration allows infrared sensor 2 to read output voltages of all thermosensitive units 10 chronologically. More specifically, as a result that voltages of second pads $V_{sel1}$ through $V_{sel8}$ for selecting respective pixel units 13 are controlled so that MOS transistors 12 successively enter an on state, output voltages of respective pixel units 13 are successively read out.

Calculating unit 7 includes IC element 3 that calculates the temperature of an object as a measurement target based on the output voltage of infrared sensor 2.

Next, a description is made of how to calculate the temperature of an object using temperature sensor 1.

Figures 10, 11, 12:
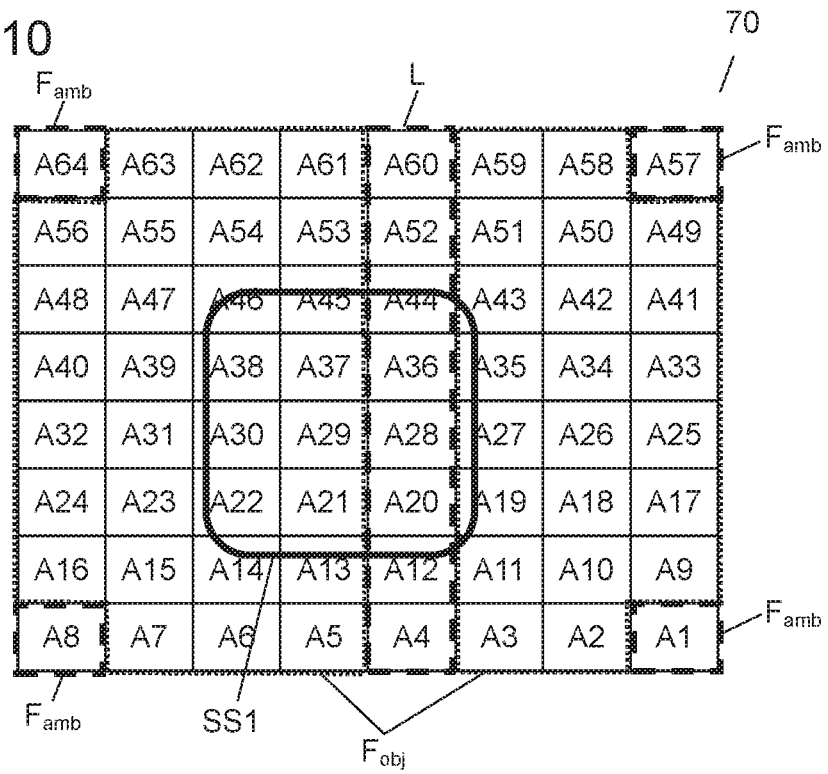
FIG. 10 illustrates the detection region of the temperature sensor according to the embodiment.
FIG. 11 shows a Gaussian filter used for correcting the temperature sensor according to the embodiment.
FIG. 12 shows a second derivative filter used for correcting the temperature sensor according to the embodiment.

FIG. 10 illustrates detection region 70 of temperature sensor 1 according to the embodiment. FIG. 10 shows area SS1 corresponding to area S1 of object 6, and detection region 70. A number inside detection region 70 corresponds to each pixel unit 13 of infrared sensor 2.

In the experiment according to the embodiment, a blackbody furnace of an area size of 10,000 mm² is placed as object 6 at a position 200 mm away from temperature sensor 1, and the temperature of the blackbody furnace is measured.

Output temperature $T_{out}$ is calculated using following expression (3), where the output voltage output from infrared sensor 2 to calculating unit 7 is $V_{out}$, and A, B, and C are coefficients. Note that details about how to calculate output temperature from output voltage are described in Japanese Patent Unexamined Publication No. 2012-13517.

$$T_{out} = \frac{-B + \sqrt{B^2 - 4 \cdot A \cdot (C - V_{out})}}{2 \cdot A} \quad \text{[Expression 3]}$$

Temperature $T_{obj}$ of object 6 is calculated using expression (3) and another arithmetic expression determined with the assumption that output voltage $V_{out}$ of infrared sensor 2 is proportional to the difference between the absorbed energy density (expressed by Planck's law, depending on temperature $T_{obj}$ of object 6) of infrared sensor 2 and the radiant energy density (expressed by the Stefan-Boltzmann law, depending on the temperature of infrared sensor 2) of infrared sensor 2. This increases the detection accuracy of temperature $T_{obj}$ of object 6.

$V_{out}$ of object 6 is calculated using an arithmetic expression obtained from the assumption that $V_{out}$ is proportional to the difference between the absorbed energy density and the radiant energy density of infrared sensor 2. $T_{obj}$ is expressed using output voltage $V_{out}$ from infrared sensor 2 based on expression (3). The absorbed energy density is expressed by Planck's law depending on temperature $T_{obj}$ of object 6. The radiant energy density, expressed by the Stefan-Boltzmann law, depends on the temperature of infrared sensor 2.

Output temperature $T_{out}$ is calculated as the temperature detected by infrared sensor 2. Actual infrared sensor 2, however, as shown in FIGS. 4 and 10, detects the temperature of object 6 as a measurement target as well as that around object 6 for area S1 of object 6 as a measurement target smaller than area S2 of detection region 70 of infrared sensor 2. Accordingly, output temperature $T_{out}$ of infrared sensor 2 contains object temperature $T_{obj}$ of object 6 as well as ambient temperature $T_{amb}$ of object 6. Consequently, calculating the temperature of object 6 from only output temperature $T_{out}$ of infrared sensor 2 creates a deviation from the actual temperature of object 6. This deviation increases as the difference between object temperature $T_{obj}$ and ambient temperature $T_{amb}$ increases. In this embodiment, correction using ambient temperature $T_{amb}$ provides accurate measurement of object temperature $T_{obj}$ of object 6.

In this embodiment, infrared sensor 2 is composed of pixel units 13 in a matrix with 8 rows and 8 columns, and output temperature $T_{out}$ of infrared sensor 2 and ambient temperature $T_{amb}$ of object 6 are calculated from the output voltage of pixel units 13.

As shown in FIG. 10, assuming the size of object 6 is approximately 5 rows and 3 columns in detection region 70 of pixel units 13 with 8 rows and 8 columns, a description is made of how to calculate output temperature $T_{out}$ and ambient temperature $T_{amb}$ hereinafter.

Assumption is made that the temperature detected at the four corners of detection region 70 of infrared sensor 2 shown in FIG. 10, namely at detection regions A1, A8, A57, and A64 (hereinafter, referred to as ambient temperature detection region $F_{amb}$) is ambient temperature $T_{amb}$. Then, output temperature $T_{out}$ is calculated that is the temperature detected at a detection region (hereinafter, referred to as object temperature detection region $F_{obj}$) other than detection regions A1, A8, A57, and A64.

First, a description is made of how to calculate output temperature $T_{out}$. Output voltage is obtained from the column including detection region A4 in the detection region for calculating output temperature $T_{out}$. The column (hereinafter, referred to as determination column L) is composed of detection regions A4, A12, A20, A28, A36, A44, A52, and A60. Here, when output voltages of the respective pixels in determination column L are compared, if the output voltage in the central part of determination column L is higher than those at both ends, namely when the output voltages of detection regions A28 and A36 are higher than those of detection regions A4 and A60, it is determined that the temperature of object 6 is higher than that around object 6. Meanwhile, when output voltages of the respective pixels in determination column L are compared, if the output voltage in the central part of determination column L is lower than those at both ends, namely when the output voltages of detection regions A28 and A36 are lower than those of detection regions A4 and A60, it is determined that the temperature of object 6 is lower than that around object 6.

Here, in the results of determination column L, if the output voltage of the central part is higher than that of both ends, it is determined that the temperature calculated from the output voltage of a pixel that produces the maximum output voltage in object temperature detection region $F_{obj}$ is output temperature $T_{out}$. Meanwhile, in the results of determination column L, if the output voltage of the central part is lower than that of both ends, it is determined that the temperature calculated from the output voltage of a pixel that produces the minimum output voltage in object temperature detection region $F_{obj}$ is output temperature $T_{out}$. As a result that output temperature $T_{out}$ is calculated in this way, output temperature $T_{out}$ is decided for the temperature around object 6 either high or low.

If object 6 is placed not in the center of object temperature detection region $F_{obj}$ but at a near end, it may be impossible to determine whether the temperature of object 6 is higher or lower than that around object 6 from results of determination column L. In such a case, determination can be made using detection regions A25 through A32 for example as a determination column or using another column as second determination column L. That is, determination column L is not limited to detection regions A4, A12, A20, A28, A36, A44, A52, and A60, but another row or column may be used.

For more than one object 6 as a measurement target, a case where output of the central part is higher than that of both ends and the opposite case may coexist depending on a column for determining. In other words, more than one maximum output value and/or more than one minimum output value can coexist in a determination column or depending on how a determination column is selected. In such a case, the next method can be used. That is, the objects are separated by the following steps for all the detection regions and the respective temperatures of the respective objects are calculated.

First, a Gaussian filter is executed for individual detection regions. This smoothes data in a detection region. An example of a Gaussian filter is shown in FIG. 11. In this example, the values in a detection region are multiplied by the respective values in the Gaussian filter of FIG. 11, and the total of the products is assumed to the value of the detection region.

Next, the second derivative filter shown in FIG. 12 is executed. The second derivative filter allows temperature inflection points present between the objects to be extracted, and a part surrounded by the temperature inflection points can be detected as an object.

Next, temperature is separately calculated for what have been detected as object 6. The temperature has only to be calculated in this way for more than one object 6.

Next, a description is made of how to calculate ambient temperature $T_{amb}$. Ambient temperature $T_{amb}$ is calculated based on output voltage of ambient temperature detection region $F_{amb}$. Concretely, the maximum and minimum output voltages are excluded from those of detection regions A1, A8, A57, and A64 of ambient temperature detection region $F_{amb}$, and the output voltages of the two remaining detection regions are averaged to calculate ambient temperature $T_{amb}$.

As a result that ambient temperature $T_{amb}$ is calculated in this way, ambient temperature $T_{amb}$ can be accurately detected even if the temperature of object 6 is detected at part of the pixels in ambient temperature detection region $F_{amb}$.

The entire perimeter of pixel units 13 may be used as a region for detecting the ambient temperature. In this case, however, object temperature detection region $F_{obj}$ becomes smaller. In this embodiment, one infrared sensor 2 is used to determine output temperature $T_{out}$ and ambient temperature $T_{amb}$. However, two infrared sensors may be used to separately measure output temperature $T_{out}$ and ambient temperature $T_{amb}$. More specifically, the following calculation may be performed. That is, output temperature $T_{out}$ is calculated using a first infrared sensor (a first infrared measurement means), and ambient temperature $T_{amb}$ is calculated using a second infrared sensor (a second infrared measurement means). In this case, the second infrared sensor has only to be placed toward a direction (e.g., a ceiling, wall) in which the temperature of object 6 is not detected. To measure ambient temperature $T_{amb}$, a thermistor for example may be used.

In this embodiment, to calculate ambient temperature $T_{amb}$, the maximum and minimum output voltages are excluded from those of ambient temperature detection region $F_{amb}$, and the output voltages of the two remaining detection regions are averaged to calculate ambient temperature $T_{amb}$. Besides this way, however, ambient temperature $T_{amb}$ may be calculated from the average value of all the output voltages of ambient temperature detection region $F_{amb}$.

In this embodiment, an example is shown where pixel units 13 are arranged two-dimensionally in a matrix with 8 rows and 8 columns. Pixel units 13, however, may be arranged one-dimensionally. In other words, pixel units 13 may be arranged with a=1 or b=1 for a matrix with a rows and b columns. For pixel units 13 arranged one-dimensionally, the temperature detected in detection regions corresponding to the pixel units at both ends has only to be ambient temperature $T_{amb}$. The temperature detected in the other detection regions has only to be output temperature $T_{out}$.

Figure 13:
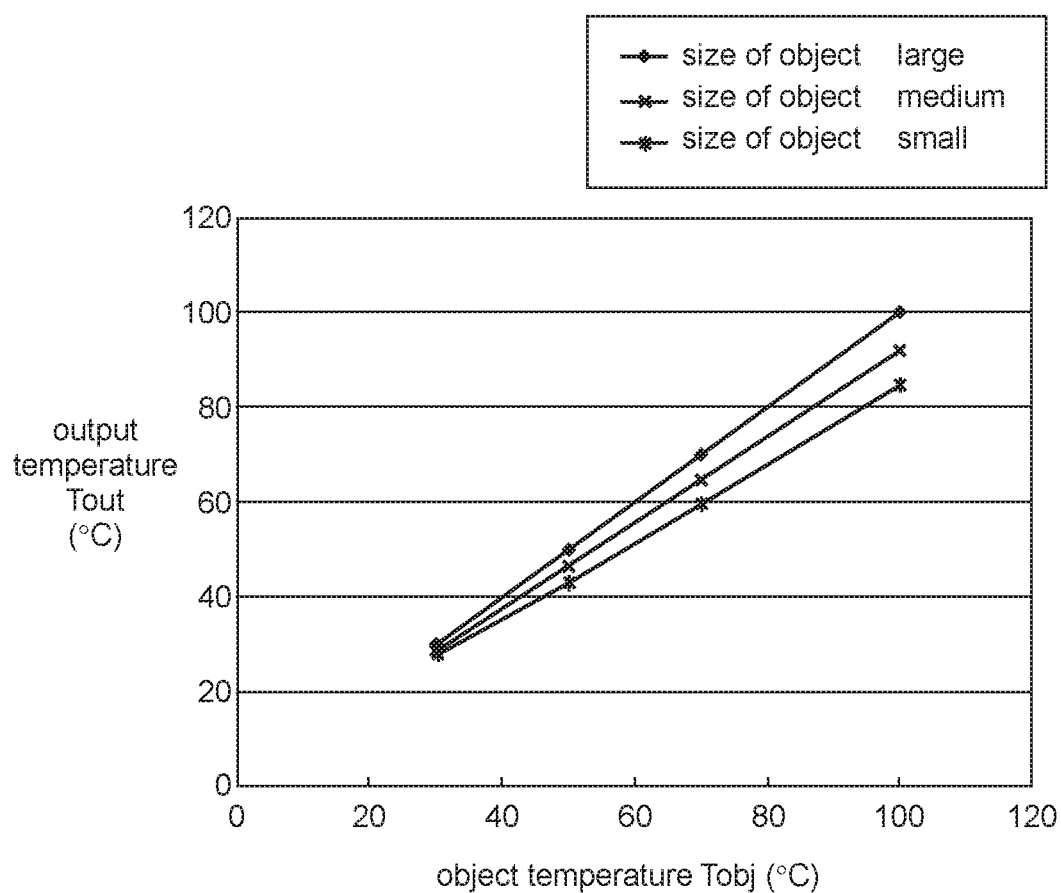
FIG. 13 illustrates experimental results of the temperature sensor according to the embodiment.

FIG. 13 shows the relationship between output temperature $T_{out}$ and object temperature $T_{obj}$ determined as described above. In FIG. 13, assuming that the size of object 6 of 10,000 mm² used in the experiment is the medium size, the result is shown that the size of the object has been changed to the large, medium, and small. Output temperature $T_{out}$ is calculated from expression (3). In the experiment, object 6 is a blackbody furnace, and thus output temperature $T_{out}$ is known. As is obvious from FIG. 13, output temperature $T_{out}$ is expressed as a linear expression on object temperature $T_{obj}$, as shown in expression (4).

$$T_{out} = d \cdot T_{obj} + e \qquad \text{[Expression 4]}$$

Here, FIG. 13 proves that gradient d and intercept e change as the size of the object changes. Gradient d is expressed by a secondary expression on A using length A of one side of object 6, area $A^2$ of object 6, and constants $d_1$, $d_2$, and $d_3$, as shown in expression (5).

$$d = d_1 \cdot A^2 + d_2 \cdot A + d_3 \qquad \text{[Expression 5]}$$

In the same way, intercept e can be expressed by a secondary expression on size A, as seen in expression (6).

$$e = e_1 \cdot A^2 + e_2 \cdot A + e_3 \qquad \text{[Expression 6]}$$

When gradient d and intercept e are expressed by expressions (5) and (6), $T_{out}$ is regarded as a linear expression, and thus coefficients $e_1$, $e_2$, and $e_3$ can be expressed by a linear expression on ambient temperature $T_{amb}$ using constants $e_{11}$, $e_{12}$, $e_{21}$, $e_{22}$, $e_{31}$, and $e_{32}$ as shown in expressions (7), (8), and (9).

$$e_1 = e_{11} \cdot T_{amb} + e_{12} \qquad \text{[Expression 7]}$$

$$e_2 = e_{21} \cdot T_{amb} + e_{22} \qquad \text{[Expression 8]}$$

$$e_3 = e_{31} \cdot T_{amb} + e_{32} \qquad \text{[Expression 9]}$$

Substituting expressions (5) through (9) in expression (4) yields expression (2). Then, correcting output temperature $T_{out}$ using area $A^2$ of object 6, length A of one side of object 6, ambient temperature $T_{amb}$, and constants $d_1$, $d_2$, $d_3$, $e_{11}$, $e_{12}$, $e_{21}$, $e_{22}$, $e_{31}$, and $e_{32}$ allows object temperature $T_{obj}$ to be expressed as expression (2).

$$T_{obj} = \frac{T_{out} - \left\{ \begin{array}{l} (e_{11} \cdot T_{amb} + e_{12}) \cdot A^2 + \\ (e_{21} \cdot T_{amb} + e_{22}) \cdot A + (e_{31} \cdot T_{amb} + e_{32}) \end{array} \right\}}{(d_1 \cdot A^2 + d_2 \cdot A + d_3)} \qquad \text{[Expression 2]}$$

Here, table 1 shows an example of constants $d_1$, $d_2$, $d_3$, $e_{11}$, $e_{12}$, $e_{21}$, $e_{22}$, $e_{31}$, and $e_{32}$ that have been experimentally determined.

TABLE 1

| | |
|---|---|
| d1 | −0.00000194 |
| d2 | 0.00159676 |
| d3 | 0.664844689 |
| e11 | 0.00000207 |
| e12 | −0.00001095 |
| e21 | −0.001735 |
| e22 | 0.011537 |
| e31 | 0.3695 |
| e32 | −2.8664 |

As shown in table 1, constants $d_1$ and $d_2$ are not larger than 1/100 constant $d_3$; constants $e_{11}$, $e_{12}$, $e_{21}$, and $e_{22}$ are not larger than 1/100 constant $e_{32}$. Accordingly, constants $d_1$, $d_2$, $e_{11}$, $e_{12}$, $e_{21}$, and $e_{22}$ can be omitted and object temperature $T_{obj}$ is expressed by expression (1). That is, with output temperature $T_{out}$ corrected, object temperature $T_{obj}$ can be expressed by expression (1).

$$T_{obj} = \frac{T_{out} - (e_{31} \cdot T_{amb} + e_{32})}{d_3} \qquad \text{[Expression 1]}$$

In this way, by correcting output temperature $T_{out}$ using constants d3, e31, and e32 experimentally determined and ambient temperature $T_{amb}$, object temperature $T_{obj}$ can be calculated well accurately by simple calculation.

As described above, with constants $d_1$, $d_2$, $e_{11}$, $e_{12}$, $e_{21}$, and $e_{22}$ omitted, object temperature $T_{obj}$ can be calculated well accurately by simple calculation as shown by expression (1). Object temperature $T_{obj}$, however, may be calculated using expression (2). Although the calculation becomes complicated if expression (2) is used, object temperature $T_{obj}$ can be calculated using length A of one side and area $A^2$ of object 6, which allows object temperature $T_{obj}$ to be measured more accurately. To measure the size of object 6, output voltages of each pixel unit in object temperature detection region $F_{obj}$ for temperature sensor 1 may be used. Besides, a sensor other than temperature sensor 1 may be provided that measures the size of object 6. As described above, an object size obtaining means for measuring the size of object 6 may be provided.

In a case where the size of the object is known to some extent from the service condition of temperature sensor 1, an object size obtaining means may be the following: an average size of object 6 under the service condition of temperature sensor 1 is recorded in calculating unit 7 in advance, and object temperature $T_{obj}$ is calculated using the average size. This way allows object temperature $T_{obj}$ to be measured more accurately than a case where object temperature $T_{obj}$ is calculated using expression (1) without a means for measuring the size of an object provided.

In the calculation by expression (2) according to the embodiment, the calculated value and the experimental value well agree with each other in a range between 253K (−20° C.) and 373K (100° C.) inclusive, providing a correlation coefficient of 0.99 or higher.

In this embodiment, calculating unit 7 that calculates object temperature $T_{obj}$ is provided in temperature sensor 1, but not limited to this way. For example, calculating unit 7 may be provided, not in temperature sensor 1, but in a microprocessor of a device (e.g., a microwave oven) that operates based on measurement results of temperature sensor 1.

The present disclosure with the above-described configuration can calculate the temperature of an object using a low-order function, which allows the temperature of an object to be measured efficiently and well accurately.

INDUSTRIAL APPLICABILITY

A temperature sensor of the disclosure performs correction using the ambient temperature of an object as a measurement target and even the size of the object for measuring the temperature of the object well accurately, and thus is particularly useful for a cooking device (e.g., a microwave oven) that measures the temperature of an object and heats the object.

The invention claimed is:
1. A temperature sensor comprising:
   a first infrared measuring unit that measures infrared rays emitted from an object and outputs a first voltage;
   a second infrared measuring unit that measures infrared rays emitted from around the object and outputs a second voltage; and a calculating unit that calculates temperature of the object by calculating output temperature of the object from the first voltage, calculating ambient temperature of the object from the second voltage, and correcting the output temperature based on the ambient temperature, wherein the first infrared measuring unit and the second infrared measuring unit are composed of one infrared sensor, wherein the infrared sensor includes a plurality of pixel units arranged two-dimensionally, wherein the second voltage is calculated based on voltages of pixel units at four corners of the plurality of pixel units, wherein the first voltage is calculated from voltages of pixel units excluding the pixel units at the four corners, and wherein the calculating unit calculates the temperature of the object from expression (2), $$T_{obj} = \frac{T_{out} - \{(e_{11} \cdot T_{amb} + e_{12}) \cdot A^2 + (e_{21} \cdot T_{amb} + e_{22}) \cdot A + (e_{31} \cdot T_{amb} + e_{32})\}}{(d_1 \cdot A^2 + d_2 \cdot A + d_3)} \quad \text{[Expression 2]}$$

where $T_{obj}$ is the temperature of the object, $T_{out}$ is the output temperature of the object, $T_{amb}$ is the ambient temperature of the object, A is a length of one side of the object, $A^2$ is an area of the object, and $e_{11}$, $e_{12}$, $e_{21}$, $e_{22}$, $e_{31}$, $e_{32}$, $d_1$, $d_2$, and $d_3$ are coefficients.

2. The temperature sensor of claim 1, wherein the calculating unit corrects the output temperature based on a size of the object in addition to the ambient temperature.

3. The temperature sensor of claim 2, further comprising an object size obtaining unit for measuring the size of the object.

4. The temperature sensor of claim 1, wherein the second infrared measuring unit is placed in a direction such that the temperature of the object is not detected.

5. The temperature sensor of claim 4, wherein the second infrared measuring unit is placed towards at least one of a ceiling and a wall.

6. The temperature sensor of claim 1, wherein the second infrared measuring unit is a thermistor.

7. The temperature sensor of claim 1, wherein the calculating unit calculates the first and second voltages based on a determination column in which output voltages of detection regions within the object and both ends of the determination column are compared.

8. The temperature sensor of claim 7, wherein the determination column is selected using at least one of a Gaussian filter and a second derivative filter.

9. A device comprising:
a first infrared measuring unit that measures infrared rays emitted from an object and outputs a first voltage;
a second infrared measuring unit that measures infrared rays emitted from around the object and outputs a second voltage;
a calculating unit that calculates temperature of the object and outputs the temperature as a corrected signal by calculating output temperature of the object from the first voltage, calculating ambient temperature of the object from the second voltage, and correcting the output temperature based on the ambient temperature; and
an operating unit that operates based on the corrected signal from the calculating unit, wherein the first infrared measuring unit and the second infrared measuring unit are composed of one infrared sensor, wherein the infrared sensor includes a plurality of pixel units arranged two-dimensionally, wherein the second voltage is calculated based on voltages of pixel units at four corners of the plurality of pixel units, wherein the first voltage is calculated from voltages of pixel units excluding the pixel units at the four corners, and wherein the calculating unit calculates the temperature of the object from expression (2), $$T_{obj} = \frac{T_{out} - \{(e_{11} \cdot T_{amb} + e_{12}) \cdot A^2 + (e_{21} \cdot T_{amb} + e_{22}) \cdot A + (e_{31} \cdot T_{amb} + e_{32})\}}{(d_1 \cdot A^2 + d_2 \cdot A + d_3)} \quad \text{[Expression 2]}$$

where $T_{obj}$ is the temperature of the object, $T_{out}$ is the output temperature of the object, $T_{amb}$ is the ambient temperature of the object, A is a length of one side of the object, $A^2$ is an area of the object, and $e_{11}$, $e_{12}$, $e_{21}$, $e_{22}$, $e_{31}$, $e_{32}$, $d_1$, $d_2$, and $d_3$ are coefficients.

10. A method of measuring temperature of an object, comprising:
measuring infrared rays emitted from the object and outputting a first voltage;
measuring infrared rays emitted from around the object and outputting a second voltage;
calculating output temperature of the object from the first voltage;
calculating ambient temperature of the object from the second voltage; and
calculating temperature of the object by correcting the output temperature based on the ambient temperature,
wherein the first voltage and the second voltage are output from an infrared sensor,
wherein the infrared sensor includes a plurality of pixel units disposed two-dimensionally,
wherein the second voltage is calculated based on voltages of pixel units at four corners of the plurality of pixel units,
wherein the first voltage is calculated from voltages of pixel units excluding the pixel units at the four corners, and
wherein the temperature of the object is calculated from expression (2), $$T_{obj} = \frac{T_{out} - \{(e_{11} \cdot T_{amb} + e_{12}) \cdot A^2 + (e_{21} \cdot T_{amb} + e_{22}) \cdot A + (e_{31} \cdot T_{amb} + e_{32})\}}{(d_1 \cdot A^2 + d_2 \cdot A + d_3)} \quad \text{[Expression 2]}$$

where $T_{obj}$ is the temperature of the object, $T_{out}$ is the output temperature of the object, $T_{amb}$ is the ambient temperature of the object, A is a length of one side of the object, $A^2$ is an area of the object, and $e_{11}$, $e_{12}$, $e_{21}$, $e_{22}$, $e_{31}$, $e_{32}$, $d_1$, $d_2$, and $d_3$ are coefficients.

11. The method of measuring temperature of an object of claim 10, wherein the output temperature is corrected based on a size of the object in addition to the ambient temperature.

12. The method of measuring temperature of an object of claim 11, further comprising measuring the size of the object.

* * * * *